Oct. 2, 1962 K. L. EISELE ETAL 3,056,927

TELEVISION RECEIVER HAVING A TUNING INDICATION

Filed Jan. 21, 1960

INVENTORS
KARL L. EISELE
GERHARD FÖRSTER
BY Frank R. Trifari
AGENT

United States Patent Office 3,056,927

Patented Oct. 2, 1962

3,056,927
TELEVISION RECEIVER HAVING A TUNING INDICATION

Karl L. Eisele, Krefeld, and Gerhard Förster, Hamburg-Stellingen, Germany, assignors to North American Philips Company, Inc., New York, N.Y., a corporation of Delaware Filed Jan. 21, 1960, Ser. No. 3,927
Claims priority, application Germany Feb. 27, 1959
4 Claims. (Cl. 325—399)

Figure 1:
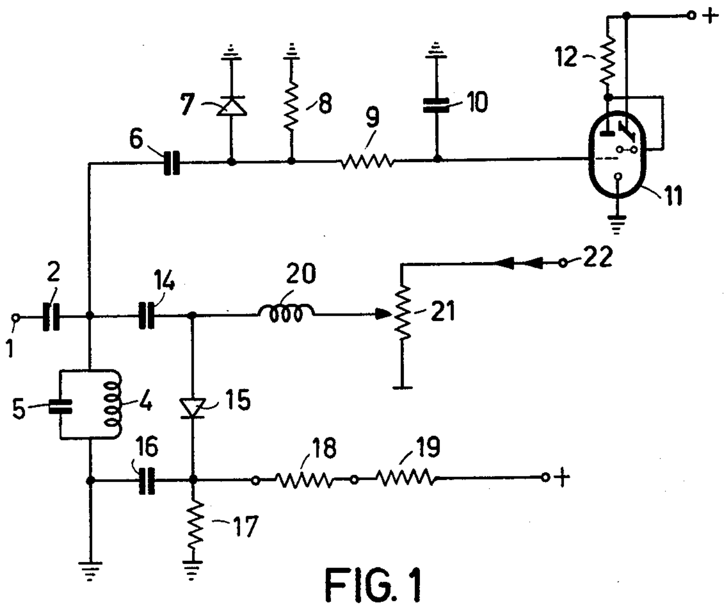

This invention relates to television receivers, operating on the single-sideband modulation system, comprising a tuning indication circuit, which includes a resonant circuit, which is tuned to the frequency, which corresponds substantially to the central position of the image carrier on the so-called Nyquist flank, this receiver comprising furthermore an arrangement for producing the voltage for automatic gain control.

In television transmission given tuning of the receiver is at the optimum for a satisfactory image reproduction, when the transmitter and the receiver are arranged for the same transmission system and the aerial signal of the receiver is sufficiently high. In the reception according to the vestigial sideband transmission system the optimum adjustment is obtained, for example, if the image carrier lies in the centre of the Nyquist flank of the receiver characteristic curve, i.e. at a value at which the characteristic curve has 50% of the maximum value with the higher frequencies of the sideband transmitted completely. However, with the reception of a weak signal, it is, in general, more favourable to choose the tuning so that the image carrier lies at a higher value, for example, at 70% of the Nyquist flank. It can then be ensured, in particular, that pulse peaks with a high-frequency, which are produced by interferences and which produce flickering sparks in the image, are attenuated.

The noise, which is also rendered visible is thus appreciably reduced, since the transmission of the high frequencies, with which noise occurs, is attenuated. With this tuning the contrast is, moreover, improved, since the low modulation frequencies are increased in amplitude. In some transmitters a predistortion of the phase transit time is introduced at the transmitter end in the transmission system in order to permit the use of simpler filters in the receivers adapted to the said transmitters. In order that a receiver adapted to these transmitters may also be used for the reception of transmitters without this predistortion, it is, in general, efficient to displace, in tuning, the image carrier to lower values on the Nyquist flank.

Such tuning modifications are performed by the user of the television receiver. In order to simplify the control, use is frequently made of a tuning indicator tube. The indication of a correct tuning is obtained, when, for example, the image carrier corresponds to the frequency of stationary, built-in resonant circuit. The aforesaid modifications of the tuning, for example, to a different value of the Nyquist flank, can then be performed by means of a detuning with respect to the indicated value. However, this involves considerably greater difficulties for the user, since he is, as a rule, not able to read a given value of detuning from the tuning indication; this often results in erroneous adjustments.

In a television receiver having a circuit arrangement for tuning indication these difficulties are avoided, whilst a correct tuning is necessarily attained, when the television receiver in accordance with the invention is characterized in that to the resonant circuit is added, for detuning it, a voltage- or current-dependent reactance element, to which is fed the, if necessary, limited output signal of the automatic gain control circuit.

Figure 2:
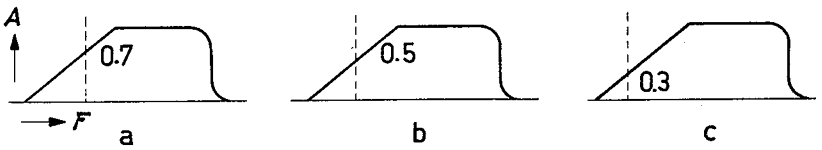

The invention will be described more fully hereinafter, by way of example with reference to the accompanying drawings, in which FIG. 1 shows an embodiment for tuning indication purposes and in FIG. 2, frequency characteristic curves of the television receiver, having a so-called Nyquist flank, are shown.

Referring now to FIG. 1, the intermediate-frequency oscillations of the incoming signal, if necessary subsequent to amplification, are supplied from a terminal 1 via a capacitor 2 to a resonant circuit (indication circuit), tuned to the image carrier frequency, which circuit comprises the coil 4 and the capacitor 5, connected in parallel herewith; the lower end of this circuit is connected to earth. The oscillations produced across this circuit are fed via a separation capacitor 6 of, for example $100/\mu/\mu f$, to the anode of a diode 7, for example, of the type OA 81, which is connected to earth, with which a load resistor 8 of, for example, 0.5 megohms is connected in parallel. The direct voltage across the resistor 8 is fed via a resistor 9 of, for example, 1.5 megohms and a smoothing capacitor 10 of, for example, $.01/\mu f$, to the control-grid of an indicator tube 11, of which the cathode is connected to earth. The anode associated with the control-grid of the triode system is connected via a resistor 12 of, for example, 0.5 megohms, to the positive terminal of the supply voltage. The anode of the triode system is connected to the control-electrode of the indication system, the screen of which is also connected to the positive terminal.

The arrangement so far described is of known kind; usually the tuning of the indication network 4, 5 is adjusted in this case so that the image carrier lies approximately in the centre of the slope of the Nyquist flank of the receiver circuits; this is illustrated in FIG. 2*b*.

In the case of a weak signal a displacement of the tuning is required so that the image carrier lies at a higher value of the Nyquist flank, for example, at a value of 0.7, as is illustrated in FIG. 2*a*. With the reception of a transmitter operating without phase predistortion by means of a receiver intended for the reception of a transmitter with predistortion of the phase the tuning is to be displaced towards lower amplitudes on the Nyquist flank so that the image carrier lies, for example, at a value of 0.3; this is shown in FIG. 2*c*.

Such a displacement can be performed by means of the arrangement shown in FIG. 1. Via a coupling capacitor 14 of, for example, 2 to $10/\mu/\mu f$, the top end of the indicating circuit 4, 5 is, to this end, connected to the anode of a diode 15, for example, of the type OA 200. The cathode of this diode is connected to earth via a capacitor 16 of, for example, $1000/\mu/\mu f$, and receives a positive bias voltage, which occurs across the resistor 17, one end of which is connected to earth while the other end is connected via a series resistor 18, 19 to the positive terminal of the voltage supply.

The anode of the diode 15 is connected via a high-frequency choke 20 to the variable tapping of a potentiometer 21, to which is fed between the terminal 22 and earth, the voltage developed by the automatic gain control circuit of the receiver.

The diode 15 is biased in the blocking direction, for example, by about −7 v. It then behaves like a capacity, which can be varied in accordance with the bias voltage, when this voltage varies to −10 or −20 v. or less. The fixed bias voltage is adjusted by means of the resistors 17, 18 and 19 and the variation is brought about by the voltage from the automatic gain control circuit. By suitable proportioning it is therefore possible to change the tuning of the indication circuit 4, 5 by means of the diode 15. So in the event of the reception of weak signals only a small negative voltage is obtained from the automatic gain control circuit. This means that the diode 15 has such a capacity that the indication circuit is tuned to a frequency which corresponds, for example, with the frequency of the image carrier as shown by the broken line in FIG. 2*a*. So by tuning the receiver in the event of the reception of such weak signals, the indicator tube 11 will indicate strongest when the image carrier has the position as shown in FIG. 2*a* and thus the user of the receiver will bring it to this position.

If, however, stronger signals are received, a greater negative voltage is obtained from the automatic gain control circuit. So the indication circuit is tuned to a frequency which corresponds, for example, with the frequency of the image carrier as shown by the broken line in FIG. 2*b*. So by tuning the receiver, in the event of the reception of such strong signals, the indicator tube 11 will indicate strongest when the image carrier has the position as shown in FIG. 2*b* and thus the user of the receiver will bring it to this position.

It will be obvious that each position of the image carrier between the positions shown in FIG. 2*a* and 2*b* can be obtained in this manner because the value of the negative voltage developed by the automatic gain control circuit varies as the intensity of the received signals varies. So the capacity of the diode 15 can be varied over a certain range as a function of the incoming signal, and thus the tuning of the indication circuit can be varied. However, as a rule, the diode 15 does not exhibit an accurately linear characteristic curve; it has, on the contrary, saturation phenomena, when in excess of a given control-voltage no capacity variation can any longer be performed. This may be utilized by causing this saturation range to be operative for stronger signals so that a further increase in the incoming signal does no longer produce any detuning.

If a transmission without phase predistortion is received by a receiver which is adapted to the reception of a transmission with phase predistortion, an adjustment as shown in FIG. 2*c* is to be obtained in the event of the reception of stronger signals. The voltage from the automatic gain control circuit has therefore to vary the tuning of the indication circuit in such a manner that it enables such a tuning of the receiver that the user will bring the image carrier into a position as shown in FIG. 2*c*. The adjustment of the new values for the detuning can be performed in a simple manner by a variation of the potentiometer 17, 18 and 19 and, if necessary, of the adjustment of the potentiometer 21 and hence of the amplitude of the control-voltage applied to the diode 15. Since the transmitter concerned is obtained in a given receiving channel, it is possible and efficient to perform the commutation in the circut of the diode 15 with the aid of the channel switch, for example, by varying the resistor 18 and, if necessary, by a displacement of the tapping of the potentiometer 21.

The measures described ensure that the natural frequency of the indicating circuit 4, 5 is shifted in the desired manner so that a maximum (or minimum) indication is obtained at the indicator tube 11, when the optimum adjustment concerned of the image carrier is attained.

The variation of the natural frequency of the indicating circuit 4, 5 may be performed in any other desired manner, for example, by varying the premagnetisation of a ferro-magnetic core in the inductor 4. Instead of using the diode 15, a voltage-dependent resistor or another sort of voltage-dependent capacitor may be employed.

A readjustment of the natural resonance of the indicating circuit 4, 5 may, if necessary, also be performed manually, when for example in accordance with the picture impression of a test picture an optimum adjustment has been found, which is to be checked or, if necessary, corrected afterwards (for example during a transmission). The manual readjustment is preferably rendered inoperative when the channel is changed, in order that, when tuning to a different transmitter, only the basic prescribed adjustment, found to be the most efficient by the manufacturer, remains.

The manual adjustment can be actuated by means of a key, which returns automatically into the initial position when the channel is changed.

The control-voltage fed to the terminal 22 may be varied in known manner, via threshold voltage devices, potentiometers and, if desired, voltage-dependent resistors, so that any desired correlation between the strength of the incoming signal and the required tuning value is obtained. It may, particularly be efficient to shift the required value to lower amplitude values of the pass curve (of FIG. 2*c*) by a smaller amount, for example, to 0.35, in order to reduce to a reasonable extent the risk of interference due to the local sound signal. The displacement to higher values on the Nyquist flank may, on the contrary, be slightly greater, for example, to 0.75.

What is claimed is:

1. A tuning indicating circuit for a receiver of the type having a characteristic exhibiting a Nyquist flank, said receiver being adapted to receive signals having a carrier normally corresponding substantially to the central position of said Nyquist flank, said tuning indicating circuit comprising a resonant circuit, means applying said signals to said resonant circuit, means connected to said resonant circuit for obtaining an indicator voltage responsive to the amplitude of said signals at a point on said resonant circuit, tuning indicator means, means applying said indicator voltage to said indicator means, a source of automatic gain control voltage, means for detuning said resonant circuit, and means applying said gain control voltage to said detuning means whereby said resonant circuit is detuned as a function of the amplitude of said gain control voltage.

2. A tuning indicator circuit for a television receiver, comprising a source of signals modulated on a carrier wave, a resonant circuit tuned substantially to the frequency of said carrier wave, means applying said signals to said resonant circuit, rectifier means connected to said tuned circuit to provide an output voltage responsive to the amplitude of signals on said resonant circuit, indicator means, means applying said output voltage to said indicator means, means for detuning said resonant circuit, a source of an automatic gain control voltage, and means applying said automatic gain control voltage to said detuning means whereby said resonant circuit is detuned as a function of the amplitude of said gain control voltage.

3. A tuning indicator circuit for a television receiver, comprising a source of signals modulated on a carrier wave, a parallel resonant circuit tuned substantially to the frequency of said carrier wave, means applying said signals to said resonant circuit, rectifier means, means connecting said rectifier means to said resonant circuit to provide an output voltage responsive to the amplitude of signals on said resonant circuit, indicator means, means applying said output voltage to said indicator means, a source of an automatic gain control voltage, variable reactance means connected in parallel with said resonant circuit, and means applying said control voltage to said reactance means to detune said resonant circuit as a function of the amplitude of said control voltage.

4. The tuning indicator circuit of claim 3, in which said variable reactance means comprises a semiconductor diode biased in the blocking direction.

References Cited in the file of this patent

UNITED STATES PATENTS

| | | |
|---|---|---|
| 2,904,630 | Bruch | Sept. 15, 1959 |
| 2,936,428 | Schweitzer | May 10, 1960 |
| 2,937,341 | Aram | May 17, 1960 |

OTHER REFERENCES

"Television Fundamentals" by Fowler and Lippert, McGraw-Hill Book Co., Inc., 1953, pp. 133 and 139.